(12) United States Patent
Scheper et al.

(10) Patent No.: US 8,771,089 B2
(45) Date of Patent: Jul. 8, 2014

(54) ELASTIC JOINT BODY HAVING A COLLAR BUSHING ARRANGEMENT TO PROTECT LOOPS

(75) Inventors: Bernd Scheper, Reichertsheim (DE); Jan Hoffman, Waldkraiburg (DE); Joachim Reihle, Schnaitsee (DE); Marc Brandl, Burgkirchen (DE); Thomas Lechner, Waldkraiburg (DE)

(73) Assignee: SGF Sueddeutsche Gelenkscheibenfabrik GmbH & Co. KG, Walkraiburg (DE)

( * ) Notice: Subject to any disclaimer, the term of this patent is extended or adjusted under 35 U.S.C. 154(b) by 0 days.

(21) Appl. No.: 13/822,698

(22) PCT Filed: Sep. 23, 2011

(86) PCT No.: PCT/EP2011/004781
§ 371 (c)(1),
(2), (4) Date: Mar. 13, 2013

(87) PCT Pub. No.: WO2012/041466
PCT Pub. Date: Apr. 5, 2012

(65) Prior Publication Data
US 2013/0172087 A1 Jul. 4, 2013

(30) Foreign Application Priority Data
Sep. 27, 2010 (DE) .......................... 10 2010 046 673

(51) Int. Cl.
*F16D 3/62* (2006.01)
(52) U.S. Cl.
USPC ............................................. 464/69; 464/95

(58) Field of Classification Search
USPC .......................................... 464/69, 87, 92–96
See application file for complete search history.

(56) References Cited

U.S. PATENT DOCUMENTS

| 1,387,532 A | 8/1921 | Dexter |
| 4,118,952 A | 10/1978 | Kobayashi |
| 4,790,794 A | 12/1988 | Takeda et al. |

(Continued)

FOREIGN PATENT DOCUMENTS

| DE | 197 42 359 A1 | 4/1999 |
| JP | 3 096718 A | 4/1991 |
| WO | 99/15803 A1 | 4/1999 |
| WO | 2009/146844 A1 | 12/2009 |

OTHER PUBLICATIONS

International Seacrh Report issued in corresponding application No. PCT/EP2011/004781 mailed Dec. 29, 2011.

*Primary Examiner* — Gregory Binda
*Assistant Examiner* — Josh Skroupa

(57) ABSTRACT

An elastic joint body for a shaft arrangement for the articulated connection of two shaft sections includes a plurality of bushings disposed in the circumferential direction at predetermined angular distances relative to a central axis of the joint body, a plurality of loop bundles, and a rubber elastic casing. Each loop bundle loops around two adjacent bushings and each bushing is looped by at least two of the plurality of loop bundles. Each of the plurality of bushings is provided with a plurality of bushing components. A first bushing component has an axial shaft section against which one of the loop bundles rests and wherein a second bushing component has a radial collar section against which the loop bundle rests. The first bushing component rests, without fixing, against the second bushing component in a contact zone offset relative to the loop bundle in the axial direction.

8 Claims, 3 Drawing Sheets

(56) References Cited

U.S. PATENT DOCUMENTS

| | | | |
|---|---|---|---|
| 6,315,670 B1 | 11/2001 | Andra et al. | |
| 7,871,331 B2 | 1/2011 | Wahling et al. | |
| 2008/0261705 A1* | 10/2008 | Wahling et al. | 464/87 |
| 2011/0300953 A1 | 12/2011 | Waehling et al. | |

* cited by examiner

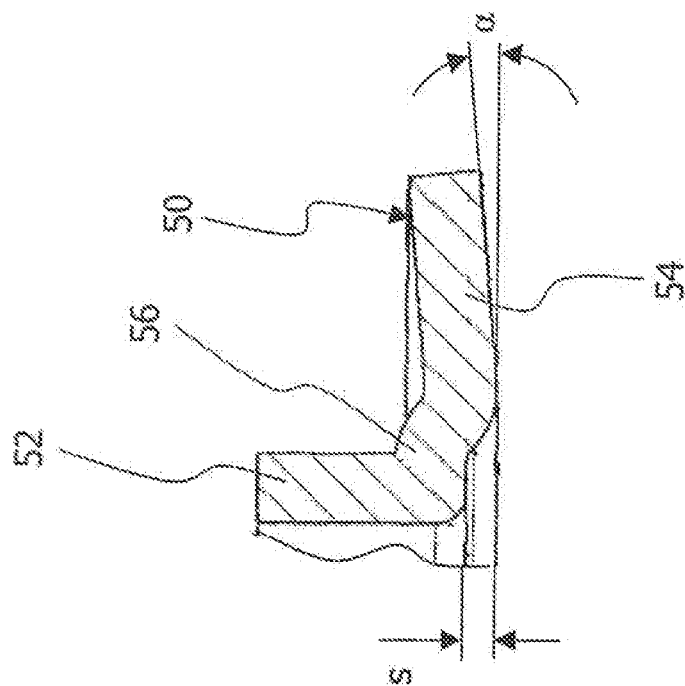
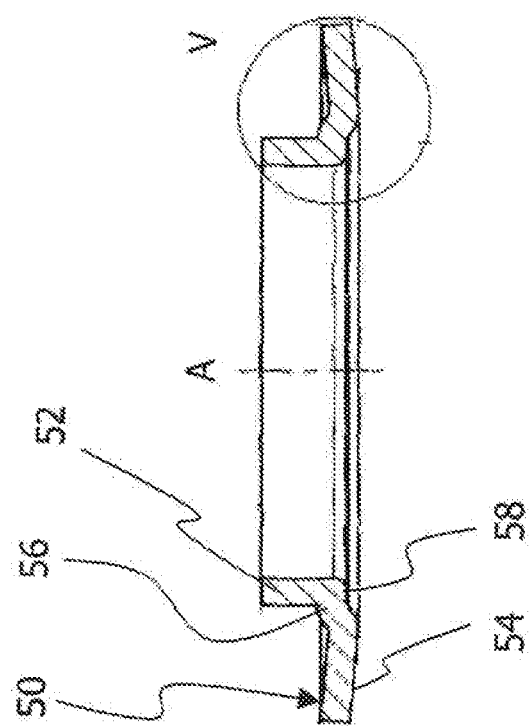
Fig. 5
Fig. 4

ELASTIC JOINT BODY HAVING A COLLAR BUSHING ARRANGEMENT TO PROTECT LOOPS

The present invention relates to an elastic joint body for a shaft arrangement for the articulated connection of two shaft sections, comprising a plurality of bushings disposed in the circumferential direction at predetermined angular distances relative to a central axis of the joint body, a plurality of loop bundles, wherein each loop bundle loops around each two adjacent bushings, and each bushing is looped by at least two loop bundles, a rubber-elastic casing in which the loop bundles and the bushings are at least partially embedded, wherein to the bushings are provided with a plurality of bushing components, wherein a first bushing component has an axial stem section against which one of the loop bundles rests, and wherein a second bushing component has a radial collar section against which the loop bundle in question rests.

Elastic joint bodies of this type are known from the prior art. Thus, for example, the document DE 10 2008 047 596 A1 describes an elastic joint body in which collar bushing arrangements, which enable a separate winding of loop bundles and subsequent slipping of the loop bundles onto the bushing arrangements in the course of assembly, are advantageously provided. Such bushing arrangements may, however, result in individual loops of a loop bundle being pinched between two bushing components during assembly. In isolated cases, in the course of the service life of such joint bodies, the problem arises that these pinched thread loops wear more quickly, which may result in a reduced service life of the elastic joint body.

Similar problems may arise with the joint body described in the prior art according to DE 37 34 089 A1.

The document DE 10 2005 003 549 B3 describes a bushing arrangement with bushing components which can be snapped on. Owing to the snap connections provided, however, in this prior art the bushing components can only be produced from materials which are relatively flexible and therefore prone to wear. This, too, may adversely affect the service life of flexible discs.

By contrast, an object of the present invention is to provide an elastic joint body of the type described at the outset which tackles the problems explained above and prevents the pinching of individual thread loops even when using rigid collar bushing components.

This object is achieved by an elastic joint body of the type described at the outset, in which it is provided that the first bushing component rests, without fixing, against the second bushing component in a contact zone, the contact zone being offset relative to the loop bundle in the axial direction.

Unlike the prior art according to DE 10 2005 003 459 B3, it is possible with such an arrangement to avoid the pinching of individual thread loops from a loop bundle, even without providing costly snap connections and accordingly suitable material pairings. According to the present invention, bushing components made from wear-resistant materials, such as for example from metal, can therefore be used. In particular, the invention provides for arranging the actual contact zone between two bushing components in such a manner that this zone does not lie in the area of the loop bundles, but is offset from these. This fundamentally prevents individual threads of a loop bundle from entering this contact zone during assembly or being drawn in a loaded state into this contact zone, and consequently being subjected to pinching or other dynamic friction effects that occur during operation.

Instead, the invention provides the advantage of collar bushing arrangements assembled from different bushing components, in conjunction with the avoidance of wear processes at a joint between two adjacent bushing components.

According to a development of the invention, it may be provided that the contact zone is offset relative to the loop bundle in the axial direction by a distance which is greater than the diameter of an individual thread of a loop bundle. Preferably, the contact zone is offset by a greater distance than the diameter of an individual thread of a loop bundle, in particular by a distance corresponding to a multiple of the diameter of a thread of a loop bundle.

According to a preferred embodiment variant of the invention, it may be provided that the second bushing component has a substantially L-shaped cross-section, the contact zone being provided by offsetting the bending point of the L-shaped cross-section. In this case, it may be provided that the amount of the offset corresponds to approximately half of the material thickness of the second bushing component. The production of such bushing components with such dimensioning is possible with relatively little outlay.

In order to be able to ensure a defined arrangement of the two bushing components, a development of the invention provides that the second bushing component has in the contact zone a planar end face against which a complementary end face of the axial stem section of the first bushing component rests in a planar manner. In this case, it must be ensured that the assembly of the two bushing components, i.e. the bringing into contact of the two end faces on the collar section of one bushing component and on the axial stem section of the other bushing component, is possible without appreciable joining forces, i.e. that the second bushing component receives the axial stem section of the first bushing component in the contact zone substantially without friction.

According to the invention, it may further be provided that the collar section of the second bushing component encloses an angle of 90° to 80°, preferably of 85°, with an axial section of the second bushing component. As a result, a kind of funnel effect is achieved by the collar section, which in the event of loading directs the thread bundles onto the axial stem section of the first bushing component.

To avoid notch effects in the rubber-elastic casing, and also to avoid sharp-edged transitions, which may, for example, impair the service life of the loop bundles, it may further be provided according to the invention that the second bushing component has rounded transitions.

The invention is explained below by way of example with the aid of the accompanying figures, in which:

FIG. 4 shows an alternative embodiment of a second bushing component in an axis-containing sectional view; and FIG. 5 shows an enlarged detail view of the cross-sectional profile according to the detail V from FIG. 4.

Figure 1:
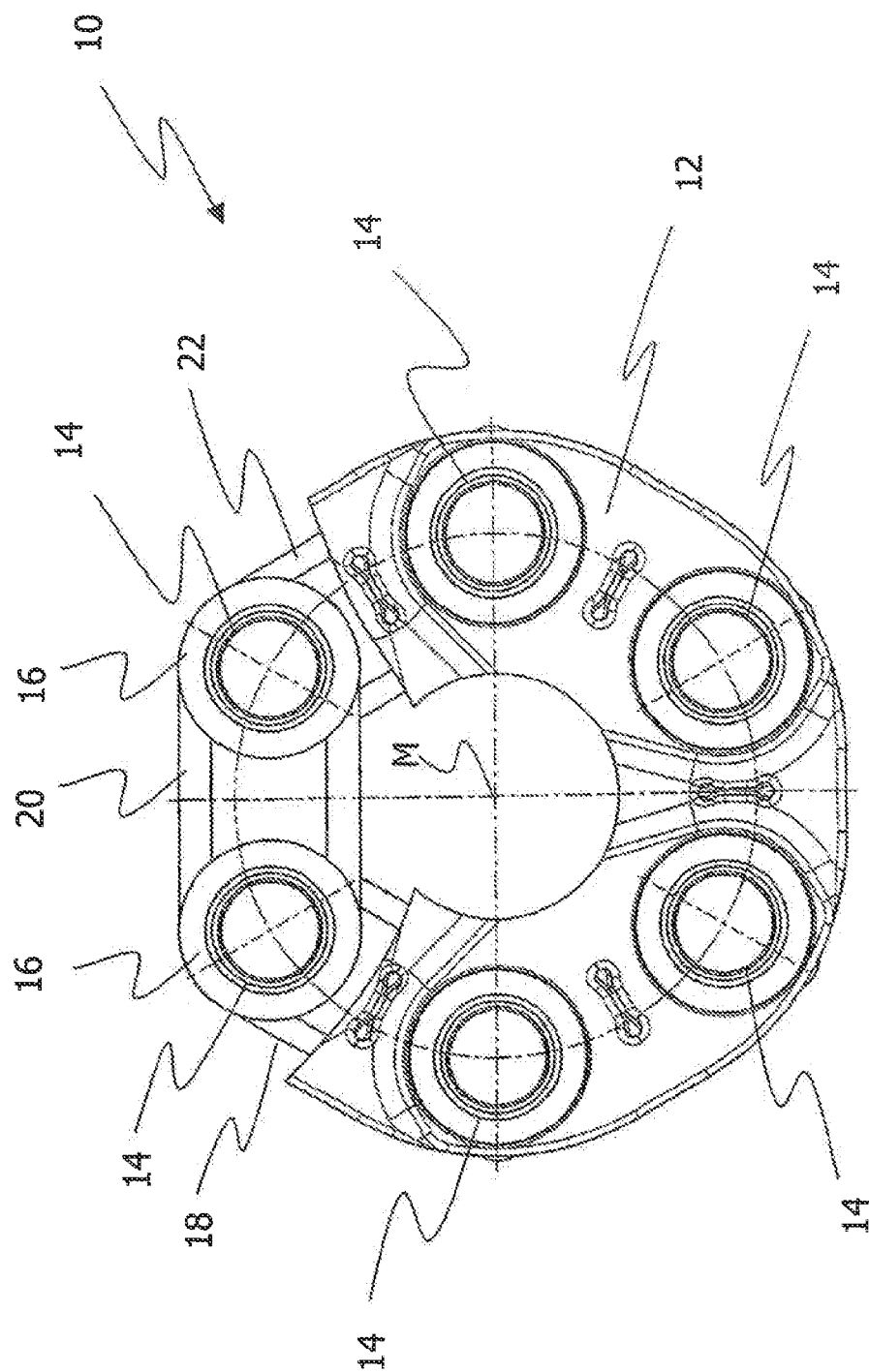
FIG. 1 shows a plan view of a partially broken-open elastic joint body according to the invention.

FIG. 1 shows a partially broken-open plan view of an elastic joint body 10 according to the invention with six bushings 14 which are surrounded by a rubber-elastic casing 12. The bushings 14 are arranged in the circumferential direction with respect to a central axis M at predetermined angular distances of the joint body 10. In the area, shown cut open in the drawing, of the joint body 10 according to FIG. 1, there can be seen the bushing components 16 on the bushings 14 which are arranged for the axial support of the loop bundles 18, 20 and 22.

It can also be seen from FIG. 1 that each individual bushing 14 is looped by a plurality of loop bundles 18, 20 and 20, 22, respectively. It may be provided here that the loop bundles 18, 22 in the installed condition of the joint body 10 in a shaft arrangement are subjected to a tensile force, while the loop bundle 20 and another parallel loop bundle (not shown in FIG. 1) which is embedded in the rubber casing 12 are subjected to compression or thrust.

Figure 2:
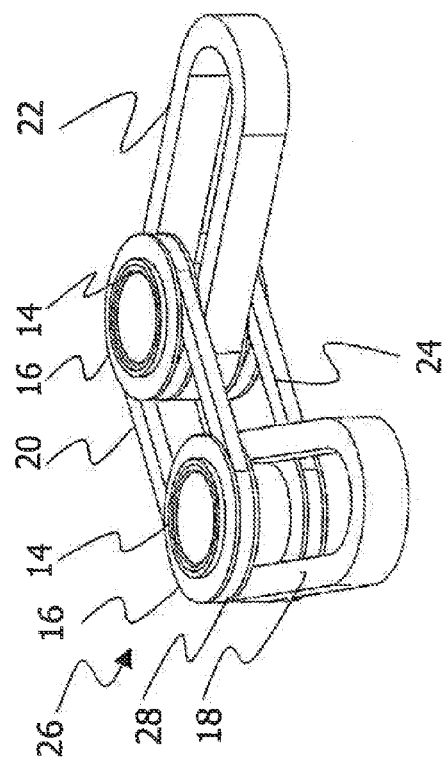
FIG. 2 shows a perspective view of an arrangement of three loop bundles around two bushings, without the rubber-elastic casing.

FIG. 2 shows a perspective illustration of a support device 26 with the outer bushing components 16 and with inner bushing components 28, only sections of which are visible in this figure, which device is arranged on the bushings 14. FIG. 2, in turn, shows that the bushings 14 are looped by a plurality of loop bundles 18, 20, 24 and 20, 22, 24, respectively. A loop bundle 18 with an enlarged cross-section, which is subjected to tensile load, is accommodated between the inner bushing components 28. Between the inner bushing components 28 and the axially outer bushing components 16 two parallel loop bundles 20, 24 are arranged on the bushing 14, which bundles may be subjected to thrust or compression.

During operation of the joint body 10, the individual loop bundles 18, 20, 22, 24 are axially supported in the heavily loaded circumferential area of the bushings 14 in the axial direction by the inner bushing components 28 and the outer bushing components 16. This allows a significant increase of the percentage bearing area of the individual loop bundles 18, 20, 22, 24 in this area. Moreover, the inner bushing components 28 separate the loop bundles which, in operation, are loaded by different forces—the tensile-loaded loop bundles 18, 22 and the thrust-loaded loop bundles 20, 24—from each other. Through the separation of the differently loaded loop bundles 18, 20, 22, 24, the friction effects between the loop bundles 18, 20, 22, 24 which adversely affect the service life are avoided, i.e. the mutual friction between the loop bundles 18, 20, 22, 24 made from the same materials is prevented.

FIG. 2 shows the modular construction of the support device 26, which significantly simplifies and shortens the production process of the elastic joint body 10. The loop bundles 18, 20, 22 and 24 are separately wound prior to assembly. This allows the use of conventional winding machines because these need not accommodate the bushings 14, as well, for winding the loop bundles. During assembly, the prefabricated loop bundles are slipped onto the bushings 14 and axially positioned by the collar sections of the bushing components 16, 28. The tensile-loaded loop bundles 18, 22 are slipped onto the bushings 14 first and then axially secured on the bushing 14 by means of the inner bushing components 28 in accordance with a predetermined desired cross-section of the tensile-loaded loop bundle 18, 22. Subsequently, the prefabricated, axially outer, thrust-loaded loop bundles 20, 24 are slipped onto the bushings 14 and are axially positioned by the axially outer bushing components 16, again in accordance with a predetermined desired cross-section.

Figure 3:
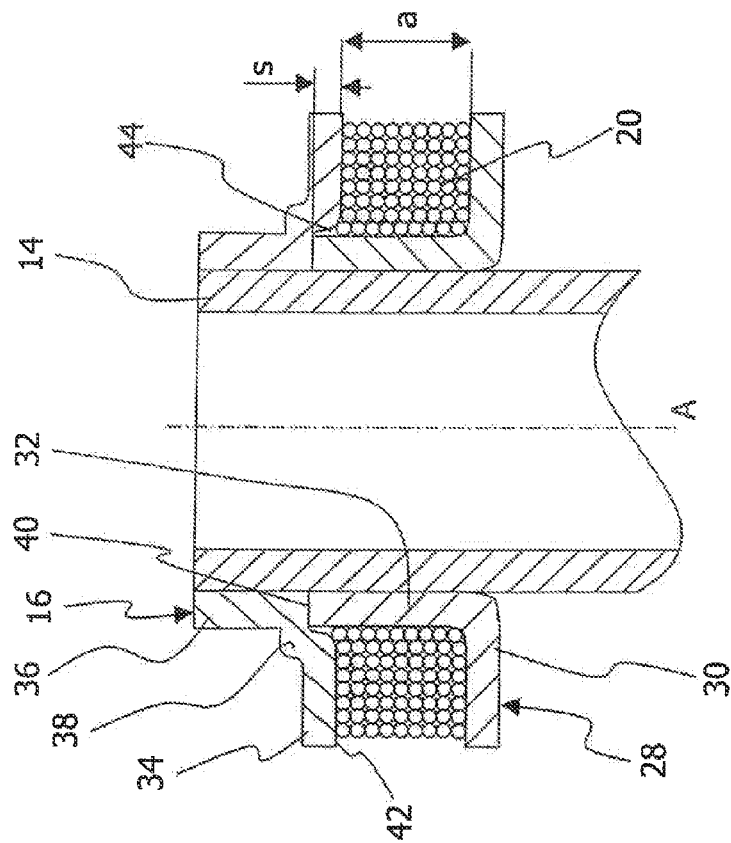
FIG. 3 shows an axis-containing sectional view of a bushing with corresponding bushing components, and of a loop bundle surrounding this bushing.

FIG. 3 shows an enlarged sectional view through a bushing 14 with two cooperating bushing components 16, 28. The inner bushing component 28 has a substantially L-shaped cross-section and is subdivided into a collar section 30 and an axial section 32. The outer bushing component 16 likewise has a collar section 34 and an axial section 36, which are connected to one another by a step-like rounded transition zone 38. In this transition zone 38, the contact zone 40 between the first bushing component 28 and the second bushing component 16 is provided. This contact zone 40, in particular the contact end faces of the inner bushing component 28 and the outer bushing component 16 resting against one another, are offset from the resting surface 42 of the loop bundle 20 in the axial direction away from the loop bundle 20 substantially by the amount s. This ensures that no thread loop or individual thread loops gets or get into the contact zone 40.

Furthermore, it can be seen that the transition zone 38 is formed in such a manner that the axial section 32 can be fitted into the set-back recess at the contact zone 40 on the second bushing component 16 with a certain amount of play, but at least in a manner substantially free from friction and hence free from resistance, in particular free from relatively large joining forces. This can be seen in FIG. 3 from the clearance 44, which shows that the two bushing components 16 and 28 can be inserted into one another in a manner free from resistance such that the two end faces rest snugly against one another in the contact zone 40. A catch mechanism with catch profiles, the production of which involves a high outlay, is not provided.

The configuration according to the invention, in particular of the outer bushing component 16, allows this contact zone 40 to be arranged in such a manner that pinching of individual threads or bundles between the inner and outer bushing components 16, 28 is prevented.

Nevertheless, the defined resting of the first bushing component 28 with its end face in the contact zone 40 against the corresponding complementary end face of the outer bushing component 16 results in a defined distance a being set between the two collar sections 30 and 34, so that no undesired subsiding processes under load can occur in the loop bundle 20.

FIGS. 4 and 5 show an alternative embodiment of an outer bushing component 50. Again, there can be seen an axial section 52 and a collar section 54 which are connected to one another by a transition zone 56. The transition zone 56 is of rounded shape, just as in the embodiment according to FIG. 3. However, it provides a defined end face 58, against which a corresponding end face of a second bushing component (not shown) can rest, in a similar manner to that shown in FIG. 3. The offset s is in this case less than half of the material thickness of the bushing component.

In FIG. 5 there can be seen especially the rounded transitions, in particular in the transition zone 56. Furthermore, in the embodiment according to FIG. 5, it can be seen that the collar section 54 at the bushing component 50 is inclined relative to the axial section 52 by the angle α. In the embodiment shown, the angle α is 5°, so that the axial section 52 encloses an angle of 85° with the collar section 54.

It is understood that the inside diameter of the stem section 52 is matched to the outside diameter of the bushing 54, so that here an interference fit or a clearance fit is present, according to requirements.

The advantage achieved by invention is that the joint between the two bushing components is arranged at a distance from the individual threads of a loop bundle and thus, even under heavy loading and in the event of subsiding processes in the loop bundle, the possibility of individual threads of the loop bundle getting into the interface (contact zone 40) between two bushing components and become worn or even destroyed there due to pinching or friction effects is precluded.

The production of the individual bushing components is carried out in the customary manner by shaping processes known per se, without high outlay in terms of time or cost.

What is claimed is:

1. An elastic joint body for a shaft arrangement for an articulated connection of two shaft sections, comprising:
a plurality of bushings disposed in a circumferential direction at predetermined angular distances relative to a central axis of the elastic joint body;
a plurality of loop bundles, wherein each loop bundle loops around each of two adjacent bushings, and each bushing is looped by at least two loop bundles;
a rubber-elastic casing in which the plurality of loop bundles and the plurality of bushings are at least partially embedded,
wherein the plurality of bushings are provided with a plurality of bushing components, wherein a first bushing component has an axial stem section and a radial collar section against which one of the plurality of loop bundles rests, and wherein a second bushing component has a radial collar section against which a loop bundle rests,
wherein the first bushing component separates loop bundles, and wherein the first bushing component rests, without fixing, with an end face of its axial stem section against the second bushing component in a contact zone which is offset relative to the loop bundle in an axial direction.

2. The elastic joint body according to claim 1, wherein the contact zone is offset relative to the loop bundle in the axial direction by a distance which is greater than a diameter of an individual thread of a loop bundle.

3. The elastic joint body according to claim 1, wherein the second bushing component has a substantially L-shaped cross-section, the contact zone being provided by offsetting a bending point of the L-shaped cross-section.

4. The elastic joint body according to claim 3, wherein an amount of the offset corresponds to approximately half of a material thickness of the second bushing component.

5. The elastic joint body according to claim 1, wherein the second bushing component has in the contact zone a planar end face against which a complementary end face of the axial stem section of the first bushing component rests in a planar manner.

6. The elastic joint body according to claim 1, wherein a collar section of the second bushing component encloses an angle (90°-α) of 90° to 80°, with an axial section of the second bushing component.

7. The elastic joint body according to claim 1, wherein the second bushing component has rounded transitions.

8. The elastic joint body according to claim 1, wherein the radial collar section of the second bushing component encloses an angle (90°-α) of 85°, with an axial section of the second bushing component.

* * * * *